(12) United States Patent
Sawyer

(10) Patent No.: US 7,340,979 B2
(45) Date of Patent: Mar. 11, 2008

(54) OIL FILTER REMOVER

(75) Inventor: George McLure Sawyer, Norwich, CT (US)

(73) Assignee: The Weinberger Group, East Brunswick, NJ (US)

( * ) Notice: Subject to any disclaimer, the term of this patent is extended or adjusted under 35 U.S.C. 154(b) by 0 days.

(21) Appl. No.: 11/395,515

(22) Filed: Mar. 31, 2006

(65) Prior Publication Data

US 2007/0227308 A1 Oct. 4, 2007

(51) Int. Cl.
*B67B 7/18* (2006.01)
*B25B 13/06* (2006.01)

(52) U.S. Cl. .......................... 81/3.4; 81/120; 81/121.1

(58) Field of Classification Search .................. 81/3.4, 81/120, 121.1, 125; 7/100
See application file for complete search history.

(56) References Cited

U.S. PATENT DOCUMENTS

| | | | | |
|---|---|---|---|---|
| 2,746,330 A * | 5/1956 | Pfetzing | ..................... | 81/124.7 |
| 2,959,994 A * | 11/1960 | Kile | ............................... | 81/64 |
| 3,385,141 A * | 5/1968 | Norman | ....................... | 81/120 |
| 4,266,452 A * | 5/1981 | Crist | ......................... | 81/124.7 |
| 4,865,727 A * | 9/1989 | Krauss | .................. | 210/167.02 |
| 5,271,299 A * | 12/1993 | Wadsworth | ................ | 81/121.1 |
| 5,421,223 A * | 6/1995 | Wawrzyniak | .............. | 81/121.1 |
| 5,924,342 A * | 7/1999 | Chou | .......................... | 81/120 |
| 6,227,078 B1 * | 5/2001 | Lemmo, Jr. | ................ | 81/121.1 |
| 6,401,574 B1 * | 6/2002 | Myers | ....................... | 81/121.1 |
| 7,107,878 B1 * | 9/2006 | Jerantowski | .............. | 81/121.1 |
| 2006/0053983 A1 * | 3/2006 | Groetsch | ................... | 81/121.1 |

* cited by examiner

*Primary Examiner*—David B Thomas
(74) *Attorney, Agent, or Firm*—Hedman & Costigan, P.C.

(57) ABSTRACT

An oil filter remover comprising a sleeve, having an interior surface, an exterior surface, an open end and a closed end with indentations on the interior surface, and a reservoir. The oil filter is slid into the oil filter remover and the oil filter is unscrewed, the excess oil being caught within the oil filter remover and collected within the reservoir.

14 Claims, 3 Drawing Sheets

OIL FILTER REMOVER

FIELD OF THE INVENTION

The present invention relates generally to the field of mechanical tools for engine maintenance, and more particularly to tools for assisting in changing oil filters.

BACKGROUND OF THE INVENTION

Engines, as used in automobiles, trucks, boats, planes, power equipment and the like, require oil to lubricate moving parts. The oil is used to prevent excess wear, increase efficiency and increase engine life. However, oil used in engines tends to break down with use over a period of time, such that the lubricity is reduced and the potential for wear increases. Additionally, oil picks up particulate contaminates caused by engine wear that can score engine parts, also reducing engine efficiency and engine life. Therefore, the oil and oil filter must be changed regularly to keep an engine running properly.

Since engine design commonly takes into account the fact that the oil and oil filter need to be changed regularly, the oil generally collects into an oil pan with a drain plug and the oil filter hangs from a portion of the engine, regularly at an angle, so that it can be unscrewed for removal and replacement. It is common practice that the oil filter be changed every time the oil is changed, to provide a clean environment in the engine.

However, there is often over 5 quarts of oil in an automobile, and more in most truck or larger engines, that needs to be removed when the oil and oil filter is changed. Even after the oil is drained from the oil drain hole in the oil pan, the oil filter retains an amount of oil due to the physical configuration of the oil filter on the engine, especially when mounted on the engine at an angle. This oil tends to leak from the engine as the oil filter is unscrewed from the engine, running down the oil filter onto the hands of the technician removing the oil filter, or onto the technician's clothes or face if positioned under the filter being removed. In addition to dirtying the hands of the technician, the oil is generally changed when the oil is hot, so that the technician can be scalded by the hot oil.

To assist in draining used oil and changing an oil filter, catch basins are used by the technician to catch the used oil and the oil dripping from the oil filter and engine. However, this does not diminish the fact that the oil draining from the oil filter and engine where the oil filter is connected runs down the filer and gets on the hands of the technician when the oil filter is being removed.

It is therefore an object of the invention to provide a way to contain the excess used oil exiting from the engine and/or oil filter when the oil filter is removed from the engine.

SUMMARY OF THE INVENTION

This and other objects are achieved by the present invention which is directed to an oil filter remover comprising a sleeve having an open end and a closed end with a reservoir for collecting used oil leaking from the engine and/or oil filter during removal of the oil filter.

In its preferred embodiment the sleeve is formed in a substantially circular configuration with indentations about the circumference that contact the oil filter housing. Between the indentations, the sleeve is positioned away from the oil filter so that the excess oil draining from the engine and/or oil filter can run down into the reservoir. The reservoir is preferably located at the closed end of the sleeve to collect the used oil.

The reservoir is preferably formed to collect a sufficient volume of oil draining from the engine and oil filter when the oil filter is removed from the engine. Although this depends on variables in such things as the size of the filter, the angle at which the oil filter is mounted on the engine, the configuration of the engine at the area where the oil filter is mounted, etc., a reservoir that can contain about a pint of oil is considered to be sufficient for most applications.

In the preferred embodiment contemplated herein, the reservoir extends outwardly from the sleeve to provide additional volume. However, it is understood that the reservoir can merely be the area between the indentations on the sleeve, when used. Thus, indentations that extend into the sleeve a greater distance will provide sufficient volume between the indentations to collect the used oil.

Depending on the materials chosen, the sleeve can be specific to the size of the oil filter being removed or can be a more universal fitting sleeve. A sleeve made of a soft or flexible material can be slightly larger than the oil filter being removed, so that the technician can deform the sides of the sleeve to grasp the oil filter for removal. Alternatively, the indentations can be formed to deform or collapse against the oil filter to fit varying sized oil filters. Either will permit the same oil filter remover to fit a number of different sized oil filters.

If a more rigid material is used, the sleeve or indentations must be generally sized to fit a particular size oil filter, either through the use of defined sizes for particular sized oil filters or using adapters about the oil filter or within the oil filter remover.

The present invention can be formed of any suitable material, especially metal, plastic or paper products. The most significant requirement in determining the material to be used, however, is the rigidity of the material used for the sleeve and/or indentations, as described above. Therefore, in its most preferred embodiment, the sleeve is therefore made of a plastic material that permits deformation to grasp the oil filter by pressing on opposed sides of the sleeve.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

DETAILED DESCRIPTION OF THE PREFERRED EMBODIMENT

Figure 1:
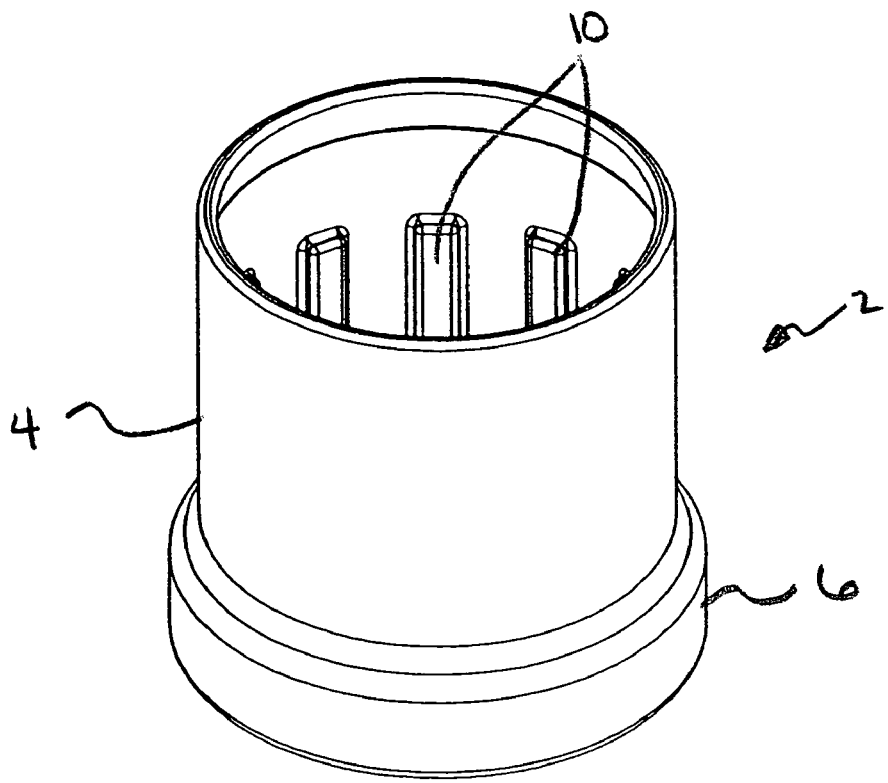
FIG. 1 is a perspective view of an oil filter remover in accordance with the present invention.
Figure 2:
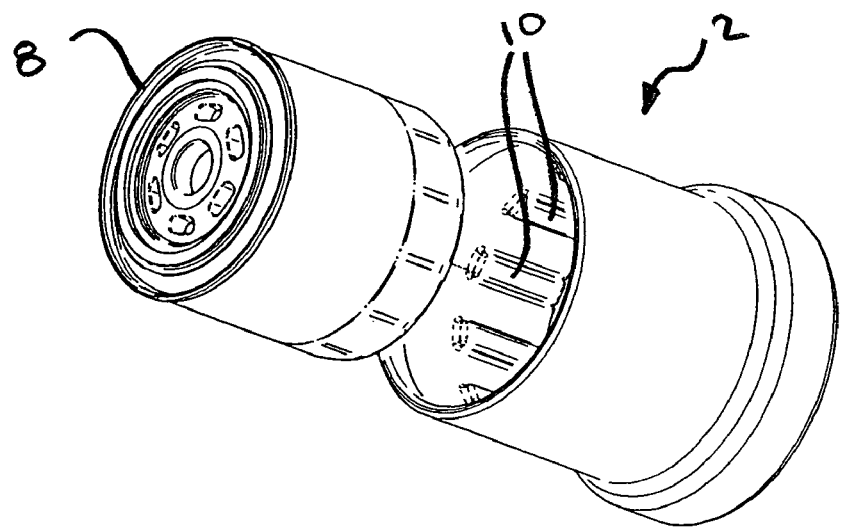
FIG. 2 is an exploded perspective of the oil filter remover of FIG. 1 with an oil filter adjacent the oil filter remover.
Figure 3:
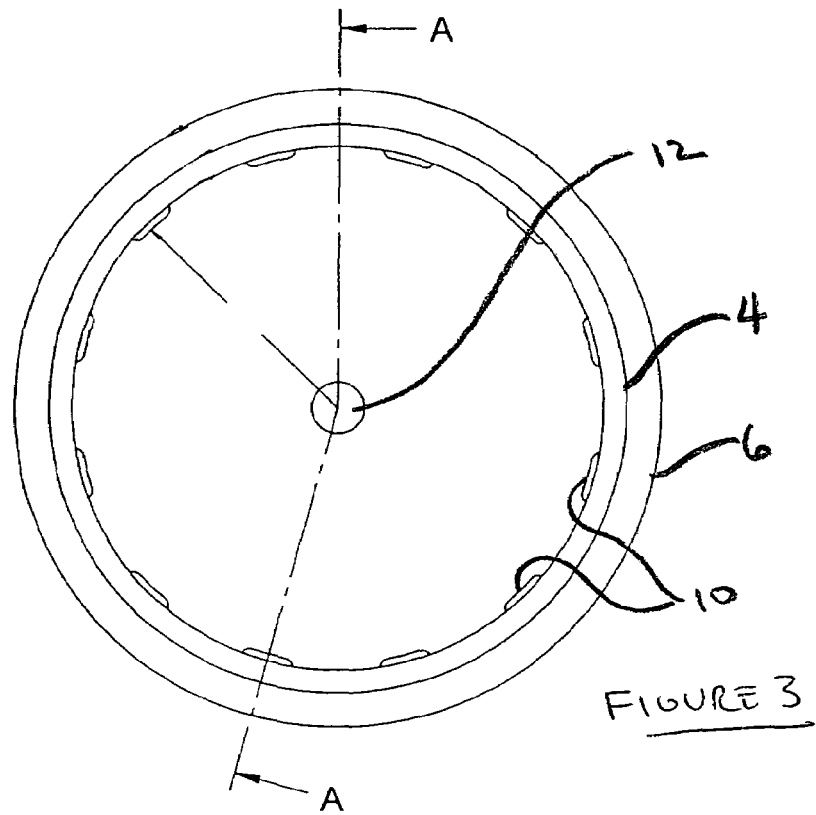
FIG. 3 is a plan view of the oil filter remover of FIG. 1.
Figure 4:
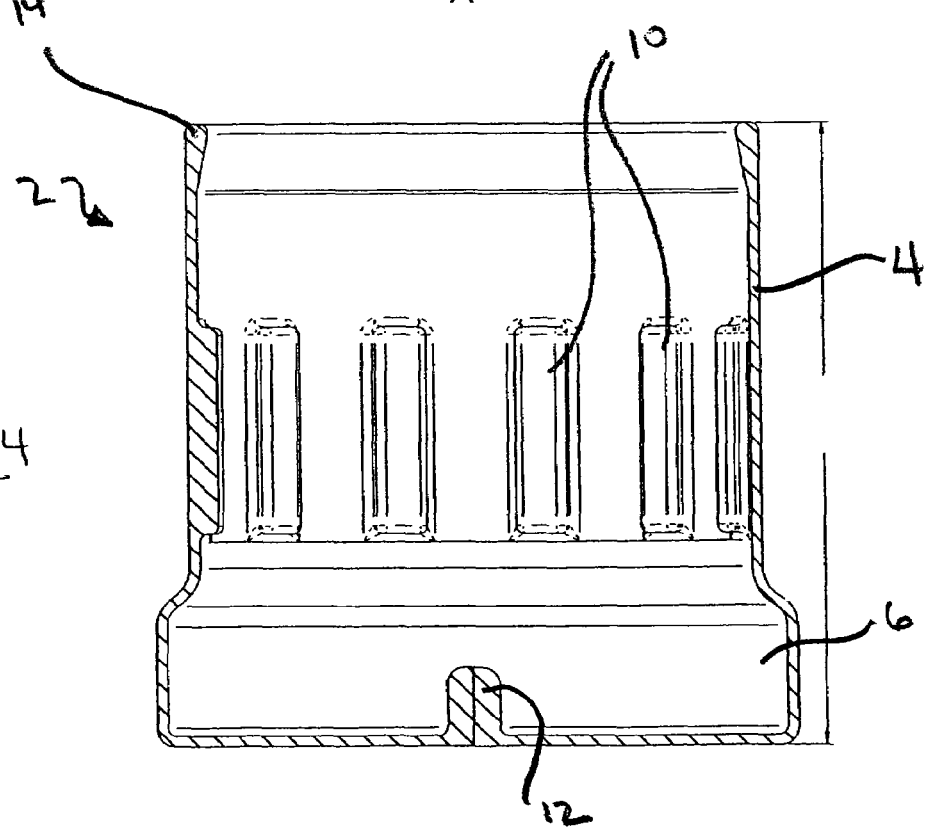
FIG. 4 is a cross-section of the oil filter remover of the present invention, taken through line A-A of FIG. 3.
Figure 5:
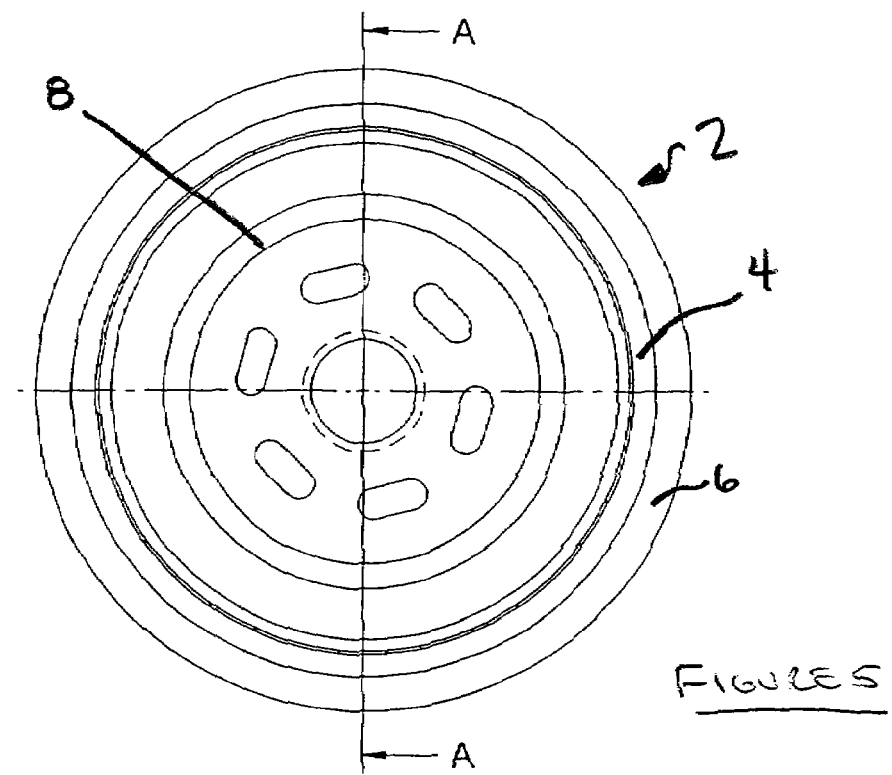
FIG. 5 is a plan view of the oil filter remover of FIG. 1 with an oil filter positioned therein.
Figure 6:
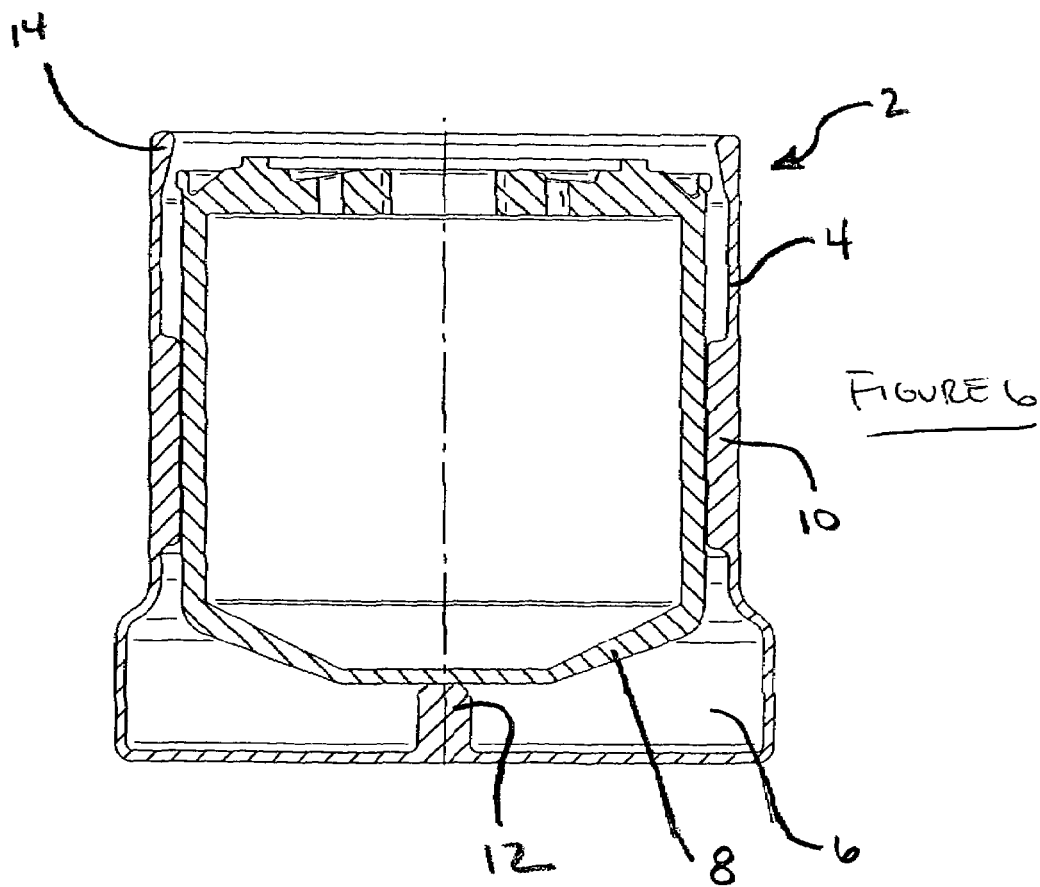
FIG. 6 is a cross-section of the oil filter remover of the present invention with an oil filter positioned therein, taken through line A-A of FIG. 5.

As shown in the drawings, and each of FIGS. 1-6, the present invention is directed to an oil filter remover 2, for removal of an oil filter 8, comprising a sleeve 4, having an open end and a closed end, and a reservoir 6. The interior of the sleeve 4 includes indentations 10 extending into the interior of the sleeve 4 to allow used oil to run between indentations 10 into the reservoir 6.

In the preferred embodiment, the closed sleeve 4 is preferably in a cylindrical configuration. Although other shapes may be used, including ovals or virtually any shapes with 3 or more sides, the circular configuration is preferred because it matches the circular configuration of most oil filter 8. In this regard, the opening of the sleeve 4 should be at least of sufficient size to accept the oil filter 8 to be removed.

The depth of the sleeve 4 is preferably enough so that the open end extends beyond the height of the oil filter 8. Of course, the sleeve 4 can be much deeper than the oil filter 8, so that the oil filter 8 slides into the sleeve 4 when it is detached from the engine, however, it is preferred that the depth of the sleeve 4 be only marginally greater than the height of the oil filter 8.

It is also preferred that the reservoir 6 be a portion of the closed end of the sleeve 4 where the used oil leaking from the engine and oil filter 8 can collect. In this embodiment, shown in the drawings, and particularly FIG. 6, it is preferred to include at least one stop 12 to limit the travel of the oil filter 8 into the sleeve 4, and the oil collected in the reservoir 6 in the preferred embodiment. Preferably, the at least one stop 12 extends upwardly from the bottom of the closed sleeve 4, however, one or more stops can extend inwardly from the wall of the sleeve 4 instead (not shown) to limit the travel of the oil filter 8 into the reservoir 6.

Additionally, it is preferred that the reservoir 6 extend outwardly from the bottom portion of the sleeve 4 to accommodate a greater volume of oil. Other embodiments, not shown, could include a sleeve 4 without an outwardly extending bottom portion, or merely utilize the space between indentations 10 as the reservoir 6 where the used oil collects. However, such a design may have limitations as to the amount of oil that can be collected in such space, depending on among other things the number and volume of the indentations 10.

Wherever located, there should be sufficient space in the reservoir 6 to collect at least an amount of oil expected when removing the oil filter 8.

The indentations 10 of the preferred embodiment shown are spaced apart about the interior of the sleeve 4 in the area where the user would grasp the oil filter 8 for unscrewing and removal. The indentations 10 provide spaces therebetween for the oil to run to the reservoir 6 or to contain the oil as the reservoir 6. They can be formed integrally with the sleeve 4, as shown, or adhered to the interior of the sleeve 4. Also, the interior surface of the indentations 10 can be knurled to provide additional friction against the oil filter 8 when being removed. Moreover, the indentations 10 can be solid, as shown in the drawings, or hollow, where they could be grasped from the exterior of the sleeve 4.

The oil filter remover 2 of the present invention can be made of any suitable material, including metal, plastic or paper products, each having its own benefits that will be apparent to one skilled in the art. Metal provides the product with the most structural integrity, however, will likely need to be sized particularly to the oil filter 8 for which it is intended.

Plastic, and preferably oil resistant plastic, provides a flexible and low cost option, where the oil filter remover 2 can be sized to fit larger size oil filters and deformed by squeezing on the sides of the sleeve 4 to engage smaller oil filters 8 for loosening. Thus, a plastic oil filter remover 2 can fit a variety of different sized oil filters 8. Additionally, when a plastic material is used, the oil filter remover 2 can be injection molded for low cost.

The oil filter remover 2 can also be formed of a paper, cardboard, tyvex or like material for disposability, however, these materials will not provide extended service. On the other hand, it is possible that such a material can create an oil filter remover 2 that can be folded for shipment or storage.

In the most preferred embodiment formed of an oil resistant plastic, the open end of the sleeve 4 includes a reinforced lip 14, preferably formed by increasing the thickness of material in the area of the open end, to improve rigidity of the sleeve 4. Moreover, hollow indentations 10 of a relatively thin walled plastic can be deformed slightly to fit a larger range of oil filter sizes.

During filter removal, the user preferably begins loosening the oil filter with an oil filter wrench until it is just hand tight. The user then slides the open end of the sleeve 4 of the oil filter remover 2 over the oil filter 8 until the oil filter 8 reaches the stop 12. The user then squeezes the sleeve 4 so that the indentations 10 engage the oil filter. The user then turns the oil filter remover 2, thereby unscrewing the oil filter 8 until it is disengaged from the engine. The user can hold the oil filter remover 2 in place to catch any residual leaking oil, or place an oil catch basin under the area to catch any last drips.

Variations, modifications and alterations to the preferred embodiment of the present invention described above will make themselves apparent to those skilled in the art. All such changes are intended to fall within the spirit and scope of the present invention, limited solely by the appended claims.

All patents referred to herein are hereby incorporated by reference.

I claim:

1. An oil filter remover comprising a sleeve having an interior surface, an exterior surface, an open end, a closed end formed of a bottom wall and a reservoir extending outwardly from the plane of the exterior surface, said inner surface having indentations thereon and said bottom wall having a stop extending upwardly from the bottom wall for limiting travel of the oil filter into the reservoir.

2. The oil filter remover of claim 1 wherein the reservoir is located at the closed end of the sleeve.

3. The oil filter remover of claim 1 wherein the oil filter remover is formed of a unitary material.

4. The oil filter remover of claim 3 wherein the oil filter remover is formed of a material taken from the group consisting of plastic, metal or paper material.

5. The oil filter remover of claim 4 wherein the oil filter remover is formed of an oil resistant plastic material.

6. The oil filter remover of claim 5 wherein the oil filter remover is injection molded of the oil resistant plastic material.

7. The oil filter remover of claim 1 wherein the indentations have a knurled surface.

8. The oil filter remover of claim 1 wherein the indentations are solid.

9. The oil filter remover of claim 1 wherein the indentations are hollow.

10. The oil filter remover of claim 1 wherein the sleeve is formed in a circular or oval configuration.

11. The oil filter remover of claim 1 wherein the sleeve is formed of a first material and the indentations are formed of a second material.

12. The oil filter remover of claim 11 wherein the first material is taken from the group consisting of plastic, metal or paper material and the second material is an elastomeric material.

13. The oil filter remover of claim 1 wherein the sleeve comprises a reinforced lip at the open end.

14. A method of removing an oil filter from an engine using an oil filter remover having an interior surface, an exterior surface, an open end, a closed end formed of a bottom wall having a stop extending upwardly therefrom, and a reservoir extending outwardly from the exterior surface with indentations on the interior surface comprising the steps of loosening the oil filter until it is hand tight, sliding the oil filter into the open end of the sleeve until it reaches the stop, grasping the oil filter at the area of the oil filter remover where the indentations are located and unscrewing the oil filter by depressing the indentations against the oil filter and turning.

* * * * *